United States Patent Office 3,158,536
Patented Nov. 24, 1964

3,158,536
METHOD FOR CONTROLLING FUNGI WITH BIS-(PENTACHLOROCYCLOPENTADIENYL)
Edward D. Weil, Lewiston, and Dale W. Young, Grand Island, N.Y., assignors to Hooker Chemical Corporation, Niagara Falls, N.Y., a corporation of New York
No Drawing. Filed Mar. 2, 1962, Ser. No. 176,905
8 Claims. (Cl. 167—30)

This invention consists of a new and improved method for the prevention and control of fungus diseases of plants by the application of bis(pentachlorocyclopentadienyl), whose empirical formula is $C_{10}Cl_{10}$.

While many organic fungicides are known, there still exists a need for improved fungicides which are capable of giving control of pathogens which are resistant to most known fungicides, and which are more persistant in action and of lower phytotoxicity than known fungicides.

It is an object of the present invention to make available a new method for the control of fungi, including those resistant to most known fungicides, with improved persistancy of protective action, and reduced phytotoxicity.

It has been found that the application of bis(pentachlorocyclopentadienyl) to plants or to the soil wherein plants are grown protects said plants against fungal pathogens.

Further, it has been found that bis(pentachloro-2,4-cyclopentadien-1-yl) of melting point one hundred and twenty-four to one hundred and twenty-five degrees centigrade is the isomer of the bis(pentachlorocyclopentadienyl) most preferred by reason of its higher melting point and easier formulation as a dust or wettable powder. However, the isomeric bis(pentachlorocyclopentadienyl) compounds of melting point eighty-two degrees centigrade and one hundred and eleven degrees centigrade, which are made by thermal or catalytic rearrangement of the one hundred and twenty-four to one hundred and twenty-five degrees centigrade isomer as described in copending application S.N. 148,898, filed October 31, 1961, may also be employed in the method of the invention. Mixtures of the isomers may also be used.

Bis(pentachloro-2,4-cyclopentadien-1-yl) is a known compound whose preparation by reaction of hexachlorocyclopentadiene with hydrogen has been described by Ruker, United States Patent 2,908,723 (1959).

The chemical, while usable in the pure form as a fungicide, is preferably employed in admixture with adjuvants to facilitate its application to, and retention by, the plants or soil to be treated. Said adjuvants include solvents, such as xylene, aromatic naphtha, and non-phytotoxic mineral or vegetable oils, anionic emulsifiers such as salts of alkylsulfonates, alkylsulfates, polyphosphates, alkylarylsulfonates, non-ionic emulsifiers such as ethers or esters of polyhydric alcohols, polyoxyethylene ethers or esters, or, in general any surface-active substance such as those listed by McCutcheon, Soap and Chemical Specialties, vol. 31 (No. 7), pp. 50–61; (No. 8), pp. 48–61; (No. 9), pp. 52–67; (No. 10), pp. 38, 67 (1955).

Other suitable adjuvants include solid powdered or granular carriers such as clays, silica, calcium carbonate, talc, wood dust, flour, or vermiculite. Further adjuvants are wetting agents, dispersing and suspending agents, sticking agents, colorants, odorants, and stabilizers.

A preferred composition of foliar application, because of ease of handling, high activity, low phytotoxicity, and favorable compatibility with other pesticides is a wettable powder composition of particle size substantially below twenty microns, comprising the toxicant bis(pentachlorocyclopentadienyl), a solid mineral carrier, a dispersing agent such as a lignin sulfonate, and a wetting agent such as a salt of an organic sulfonic acid. Said wettable powder is dispersed in water before use.

The method of application consists of applying the toxicant, preferably with adjuvants such as described above, to the locus to be protected from fungal infestation. Said locus may consist of the plant foliage, fruit, seed, tubers, roots or stem, or of the soil or other medium in which desired plants are to be grown.

The rate of application should be such as to leave a fungicidal or fungistatic concentration at the locus of application; the required rates will depend on the mode of application, the severity and type of fungal infestation, weather conditions, and duration of protection required, but generally can be stated to be on the order of about 0.1 to about twenty pounds per acre of plants treated, or in soil applications, from one to one thousand parts of toxicant per million parts of treated soil, or in seed applications, from 0.1 to one hundred ounces per bushel of seed.

The examples below are given to further illustrate the invention, but are not to be construed as limiting, except as defined in the appended claims.

*Example 1.—Formulation of Bis(Pentachlorocyclopentadienyl) Isomers as Emulsifiable Concentrates*

The following ingredients were blended:

| | Pounds |
|---|---|
| Bis(pentachloro-2,4-cyclopentadien-1-yl) | 1.5 |
| Emcol 300X emulsifier (non-ionic/anionic surfactant blend) | 0.1 |
| Emcol 500X emulsifier (non-ionic/anionic surfactant blend) | 0.14 |
| Xylene to 1 gal. total. | |

The resultant blend was emulsifiable with water in any proportion.

Similar formulations were made using the two $C_{10}Cl_{10}$ isomers of melting point eighty-two and one hundred and eleven degrees centigrade.

*Example 2.—Formulation of Bis(Pentachloro-2,4-cyclopentadien-1-yl) as Wettable Powder*

The following ingredients were blended and then ground in a fluid energy mill to a particle size averaging two microns:

| | Parts by weight |
|---|---|
| Bis(pentachloro-2,4-cyclopentadien-1-yl) | 1 |
| Attapulgus clay | 0.86 |
| Marasperse N (a lignin sulfonate dispersing agent) | 0.1 |
| Sorbit P (a sodium alkylaryl sulfonate wetting agent) | 0.034 |

The resultant powder is usually dispersed in water before spraying, but can also be employed as a dry dust.

EXAMPLE 3

Forty-eight large potted Talisman rose plants were divided into three groups of sixteen plants each. One group was sprayed with water emulsion of a 1.5 pound-per-gallon emulsifiable xylene formulation of bis(pentachloro-2,4-cyclopentadien-1-yl) at 0.12 percent active ingredient concentration. A second group of plants was sprayed with a wettable powder formulation of the same compound at 0.12 percent active ingredient concentration. A third group was left unsprayed, as a control. All the plants were then inoculated with a suspension of spores of *Diplocarpon rosae* containing 356,000 spores per milliliter, obtained from roses showing typical black spot disease symptoms. The inoculated plants were then held for three weeks, at which time the untreated control plants showed severe black spot disease symptoms, including extensive defoliation. The two groups of treated plants showed relatively little spotting or defoliation.

EXAMPLE 4

Soil heavily infested with *Rhizoctonia solani* was admixed with micronized (two to twenty micron particle size) bis(pentachloro-2,4-cyclopentadien-1-yl) at the rate of sixty-four pounds per acre. Cotton seeds were planted therein, and these seeds subsequently germinated to give normal seedlings. Cotton seeds planted in the same soil without the chemical failed to yield seedlings, because of damping off.

EXAMPLE 5

Soil heavily infested with *Sclerotium rolfsii* (the fungal pathogen of Southern blight) was admixed with an emulsion of bis(pentachloro-2,4-cyclopentadiene-1-yl) to give a concentration of twenty parts per million of toxicant in the soil.

Cotton seedlings transplanted into the treated soil grew normally. Cotton seedlings transplanted into the same soil without the addition of the toxicant developed symptoms of Southern blight and died back within two weeks.

EXAMPLE 6

Bean plants of the tendergreen variety were inoculated with spore suspensions of bean mildew (caused by Oidium species) and then, one day later, divided into four groups, three of which were sprayed with aqueous emulsions of the three isomers of bis(pentachlorocyclopentadienyl), specifically the isomers of melting point eighty-two degrees centigrade, one hundred and eleven degrees centigrade, and one hundred and twenty-four to one hundred and twenty-five degrees centigrade (bis(pentachloro-2,4-cyclopentadien-1-yl)), in each case at twenty-five parts per million concentration.

After one week in a humid greenhouse, the unsprayed inoculated control group showed severe infection of the foliage by mildew, whereas the three treated groups were substantially free of infection.

While certain representative embodiments and details have been shown for the purpose of illustrating the invention, it will be apparent to those skilled in this art that various changes and modifications may be made therein without departing from the scope or spirit of this invention.

We claim:

1. A method for the control of fungus diseases of plants which comprises applying a fungitoxic amount of bis(pentachlorocyclopentadienyl) to the locus to be protected.

2. The method of claim 1 where the chemical applied is bis(pentachloro-2,4-cyclopentadien-1-yl).

3. The method of claim 1 wherein the chemical is applied to plant foliage.

4. The method of claim 1 wherein the chemical is applied to the soil.

5. The method of claim 1 wherein the fungus is *Diplocarpon rosae*.

6. The method of claim 1 wherein the fungus is *Rhizoctonia solani*.

7. The method of claim 1 wherein the fungus is *Sclerotium rolfsii*.

8. The method of claim 1 wherein the fungus is Oidium.

References Cited in the file of this patent

UNITED STATES PATENTS

| | | |
|---|---|---|
| 2,724,730 | Johnson | Nov. 22, 1955 |
| 2,799,613 | Blodorn | July 16, 1957 |
| 2,859,233 | Graham et al. | Nov. 4, 1958 |
| 2,908,723 | Rucker | Oct. 13, 1959 |